United States Patent [19]

Aiman et al.

[11] 4,415,339
[45] Nov. 15, 1983

[54] SOLAR COAL GASIFICATION REACTOR WITH PYROLYSIS GAS RECYCLE

[75] Inventors: William R. Aiman, Livermore; David W. Gregg, Morago, both of Calif.

[73] Assignee: The United States of America as represented by the U.S. Department of Energy, Washington, D.C.

[21] Appl. No.: 251,662

[22] Filed: Apr. 6, 1981

[51] Int. Cl.³ .............................. B01J 3/00; F23J 3/02
[52] U.S. Cl. ..................... 48/62 R; 48/111; 48/209; 48/77; 48/210; 126/452
[58] Field of Search ............... 126/452, 438; 48/62 R, 48/202, 77, 111, 210, 209

[56] References Cited

U.S. PATENT DOCUMENTS

| | | | |
|---|---|---|---|
| 2,694,623 | 11/1954 | Welty, Jr. et al. | 48/62 R X |
| 3,993,458 | 11/1976 | Antal, Jr. | 48/202 X |
| 4,149,856 | 4/1979 | Keller | 48/62 R |
| 4,183,733 | 1/1980 | Jäger | 48/77 |
| 4,229,184 | 10/1980 | Gregg | 126/438 X |

Primary Examiner—Larry Jones
Attorney, Agent, or Firm—Harold M. Dixon; Roger S. Gaither; Richard G. Besha

[57] ABSTRACT

Coal (or other carbonaceous matter, such as biomass) is converted into a product gas that is substantially free from hydrocarbons. The coal is fed into a solar reactor (10), and solar energy (20) is directed into the reactor onto coal char, creating a gasification front (16) and a pyrolysis front (12). A gasification zone (32) is produced well above the coal level within the reactor. A pyrolysis zone (34) is produced immediately above the coal level. Steam (18), injected into the reactor adjacent to the gasification zone (32), reacts with char to generate product gases. Solar energy supplies the energy for the endothermic steam-char reaction. The hot product gases (38) flow from the gasification zone (32) to the pyrolysis zone (34) to generate hot char. Gases (38) are withdrawn from the pyrolysis zone (34) and reinjected into the region of the reactor adjacent the gasification zone (32). This eliminates hydrocarbons in the gas by steam reformation on the hot char. The product gas (14) is withdrawn from a region of the reactor between the gasification zone (32) and the pyrolysis zone (34). The product gas will be free of tar and other hydrocarbons, and thus be suitable for use in many processes.

10 Claims, 2 Drawing Figures

SOLAR COAL GASIFICATION REACTOR WITH PYROLYSIS GAS RECYCLE

BACKGROUND OF THE INVENTION

The present invention relates in general to hydrocarbon gasification, and more particularly to a hydrocarbon gasification system utilizing solar energy. The United States Government has rights in this invention pursuant to Contract No. W-7405-ENG-48 between the U.S. Department of Energy and the University of California for the operation of Lawrence Livermore National Laboratory.

The United States has a vast energy resource in the form of coal. The energy can be released from the coal through conventional power plant technology, wherein the coal is burned to produce steam and the steam is in turn used to produce electricity. It is also possible to produce a synthetic gas from coal that can be used in place of natural gas. It is, however, important to note that projected energy shortages for the United States over the near term appear to be for liquid fuels, particularly liquid fuels for powering automobiles and other forms of transportation. A system that would utilize hydrocarbons such as the vast coal deposits for the economical production of liquid fuels would be an important contribution to solutions to energy problems facing the United States.

Preliminary research has demonstrated the potential for utilizing solar energy to gasify coal and/or other carbonaceous matter such as hydrocarbons or biomass. Conventional gasifiers burn part of the coal to provide the heat required to drive the gasification reactions. A solar gasifier uses focused sunlight to provide this heat, which incorporates a renewable energy source in the gasification process. In addition, a substantial fraction of the solar energy is converted into chemical energy in the process, and the converted energy is stored in the product. Since solar energy is used rather than burning part of the coal to provide energy, less coal is required which conserves that resource and reduces potential environmental problems associated with the use of coal proportionately.

Solar coal gasification systems have been proposed, but all such systems would produce a combination of gases in the product stream. The combinations of gases typically include gases containing hydrocarbons, such as methane. Such hydrocarbon-containing product streams would be highly useful for pipeline quality gas, but would require expensive refining to produce liquid fuels suitable for powering motor vehicles. It is desirable to provide a system for gasifying coal, other hydrocarbons, and/or biomass, and produce a product stream that is free from hydrocarbons.

DESCRIPTION OF PRIOR ART

A solar energy coking apparatus is described in U.S. Pat. No. 2,760,920 to R. B. Olsen, patented Aug. 28, 1956. A parabolic surface is covered with small flat rectangular mirrors and an absorber is mounted above the parabolic mirror covered surface. Coal is fed to the absorber.

A hydrocarbon gasification system utilizing solar energy is described in U.S. Pat. No. 3,993,458 to Michael J. Antal, Jr., patented Nov. 23, 1976. Steam, $CO_2$, or some mixture of these two gases is heated to a temperature of 600° C. or more in a chemical reactor located at the focus of a tower top solar furnace. This working fluid is used to fluidize a reactant bed of char and organic material. Solid wastes, shredded or unshredded, depending on the economics of the system, are introduced into the reactor.

In U.S. Pat. No. 4,149,856 to Willy Keller, patented Apr. 17, 1979, a method and apparatus for producing a gaseous fuel by means of solar energy is described. A piece of carbon is heated through exposure to reflection-focused solar radiation and contacting it with steam to provide gaseous fuel.

In U.S. Pat. No. 4,229,184 to David W. Gregg, patented on Oct. 21, 1980, improved apparatus and method of solar coal gasification is disclosed. The process uses coal rather than carbon, avoids catalyst use, and provides for continuous operation among its many features. The disclosures of the patent and continuation-in-part application Ser. No. 174,964, filed Aug. 4, 1980, and now abandoned are incorporated herein.

SUMMARY OF THE INVENTION

The present invention provides a solar coal gasification reactor with a pyrolysis gas recycle stream. The pyrolysis gas recycle stream substantially eliminates hydrocarbon in the product stream by steam reformation on hot char. The product is substantially free, if not entirely free, of tar and other hydrocarbons, and thus be suitable for direct use in many processes. A coal feed is transmitted into the solar reactor. Solar energy is directed into the solar reactor and onto char produced from the coal feed, thereby producing a gasification zone spaced from the coal feed and generating hot gases from the char. These hot gases flow countercurrent to the solid phase, and produce a pyrolysis zone between the gasification zone and the coal feed entry point. Pyrolysis gases and char are produced in the pyrolysis zone, and the pyrolysis gases are recycled to the gasification zone. The product gas is withdrawn from the reactor in a region where the coal feed has been reduced to char.

It is an object of the present invention to provide a coal gasification reactor that will produce a product stream that is relatively free from hydrocarbons. It is a further object of the present invention to provide a solar coal gasification system that utilizes a pyrolysis gas recycle stream and injected steam (and/or $CO_2$, $H_2$ or $CH_4$) to eliminate hydrocarbons in the product stream by steam reformation of methane and higher hydrocarbons on the hot char.

Additional objects, advantages, and novel features of the invention will be set forth in part in the description which follows, and in part will become apparent to those skilled in the art upon examination of the following, or appreciated by practice of the invention. The objects and advantages of the invention can be realized and attained by means of the instrumentalities and combinations particularly pointed out in the appended claims.

To achieve the foregoing and other objects, and in accordance with the purpose of the present invention, as embodied and broadly described herein, the system of this invention can comprise the production of a substantially hydrocarbon-free product gas from a solar reactor utilizing a coal feed by transmitting the coal feed into the solar reactor and directing solar energy into the solar reactor onto char produced from the coal feed. A gasification zone is produced above the coal feed entry point which is driven principally by the action of the solar energy on the char. In turn, the hot gases from gasification of said char produce a pyrolysis zone below the gasification zone (i.e., between the gasification zone and the feed entry) with pyrolysis gases and char being produced in the latter. The pyrolysis gases are withdrawn from a region of the reactor below the pyrolysis zone (i.e., the pyrolysis zone and the feed entry), and injected (with a reactive gas such as steam, $CO_2$, $H_2$ and $CH_4$) into a region of the reactor above the gasification zone (i.e., between the reactor entry of the solar energy and the gasification zone). Substantially hydrocarbon-free product gas is withdrawn from a region of the reactor below the gasification zone and above the pyrolysis zone.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings.

DETAILED DESCRIPTION OF THE INVENTION

Figure 1:
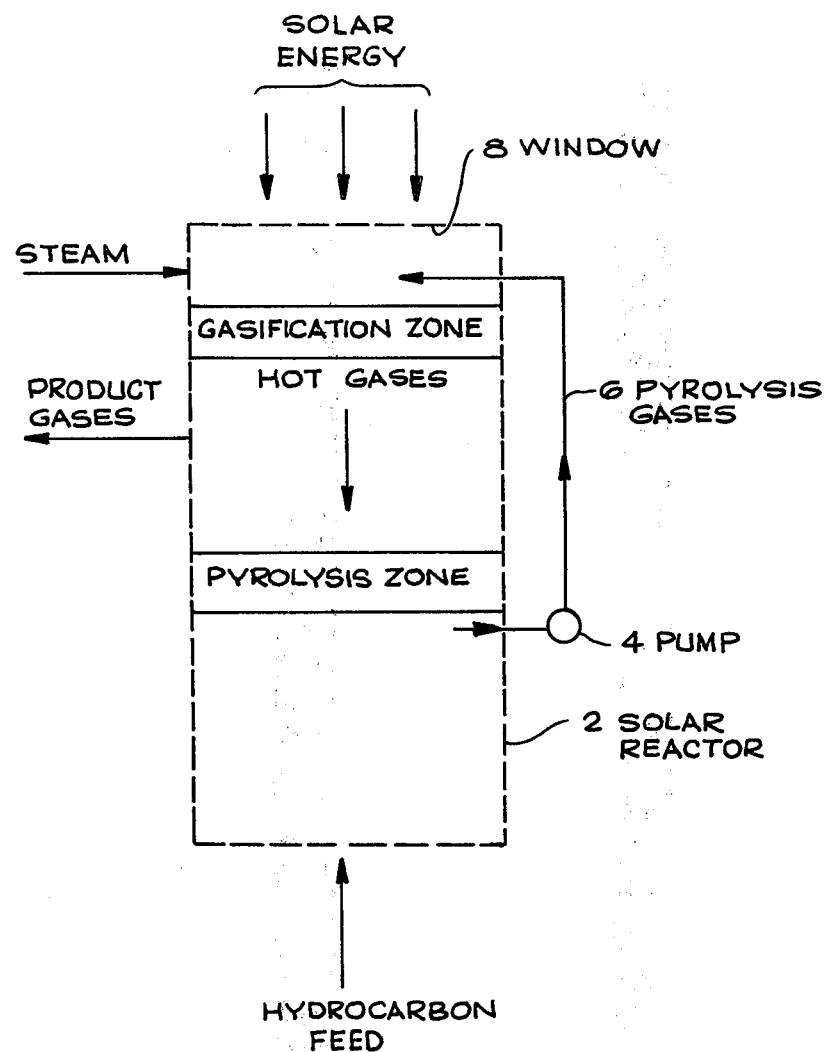
FIG. 1 is a diagrammatic illustration of a system that embodies the present invention.

Referring now to the drawings, and in particular to FIG. 1, a system that embodies the present invention is illustrated. A coal or other carbonaceous-material feed is introduced into a solar reactor 2 and a product gas is produced. This system has particular utility for the gasification of coal using solar energy. The coal is gasified by reacting it with steam (or $CO_2$ or $H_2$) in the focal zone of a solar central receiver plant. Because the coal-steam reaction is endothermic, the product gas has greater heating value than the initial coal. The necessary energy to drive the endothermic reaction is provided by the focused solar energy. Solar energy is thus converted into chemical energy at the same time coal is gasified. This process has the dual attractions of upgrading coal to a more easily utilized form of fuel and of chemically storing solar energy.

The chemistry of coal gasification involves the two basic steps of pyrolysis and char gasification. Pyrolysis chemistry simply describes the manner in which coal decomposes when heated, and can be represented in a simple fashion as follows:

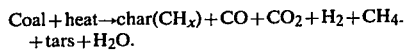

The energy required for this reaction is relatively small, because these decomposition reactions are only slightly endothermic. The primary energy requirement involves heating the coal to pyrolysis temperatures. The mass liberated by pyrolysis can vary from only a few to as much as 40 wt%, depending on the particular coal.

The char-gasification chemistry can be represented in a simple fashion by the following equation:

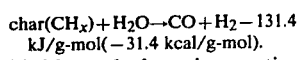

This highly endothermic reaction is the primary reaction for chemically storing solar energy in product gas, and adds 131.4 kJ/g-mol to the heat of combustion of the product gas. Because the heat of combustion of 1 g-mol of $H_2$ + 1 g-mol of CO is 525 kJ/g-mol, solar energy contributes approximately 25% to the heating value of the product gas that results from the char gasification step. The net contribution of solar energy to the heating value of the product gas will depend on the relative magnitudes of the pyrolysis and char-gasification steps and thus on the particular coal being gasified.

The fixed or natural water in the coal normally does not exceed about 35% which is the approximate weight of water in Wyodak coal. This process will operate satisfactily on such coals and in fact on coal feeds containing about 50% by weight of water. When the relative amount of water in the feed, whether fixed or mixed therewith, exceeds about 50%, the feed should be pre-dried. Ambient air drying while protected from condensation (i.e., snow, ice or rain) usually suffices, particularly at drying temperatures above freezing. The natural water is converted to steam in the process.

It should be clearly understood that the figures and discussion which follow relate to a steady state condition of carrying out the present invention. There is always an initial and transient condition upon start-up which is not described, during which a char bed is produced.

The solar energy coal gasification reactor 2 illustrated diagrammatically in FIG. 1 provides an improved product gas because the product gas is substantially free from hydrocarbons. The concentrated solar energy entering the reactor 2 through a window 8 acts upon the coal feed within the reactor, producing a gasification zone spaced from the unreacted feed. Hot gases are generated in the gasification zone, and these hot gases produce a pyrolysis zone between the gasification zone and the unreacted feed. Pyrolysis gases are produced in the pyrolysis zone. The pyrolysis leaves a char residue between the pyrolysis zone and the gasification zone which moves to the latter and is gasified there. The pyrolysis gases are withdrawn from the pyrolysis zone utilizing a pump 4 and recycle line 6, and inserted at a point proximate the gasification zone. Preferably steam is injected into the reactor 2, but other reactive gas (i.e., reacts with char to produce a gas) such as $CO_2$, $H_2$ or $CH_4$, etc. can be injected. Hydrocarbons are eliminated from the product stream by steam reformation on the hot char in the gasification zone. The product gas is withdrawn from a region of the reactor between the gasification zone and the pyrolysis zone. Ash generated by the gasification can be removed by any one of several means (not shown). For example, at the top of the char in the gasification zone there can be scrapers or steam jets. Removal of the ash is important to eliminate its accumulation and to maintain solar energy contact with the char.

Figure 2:
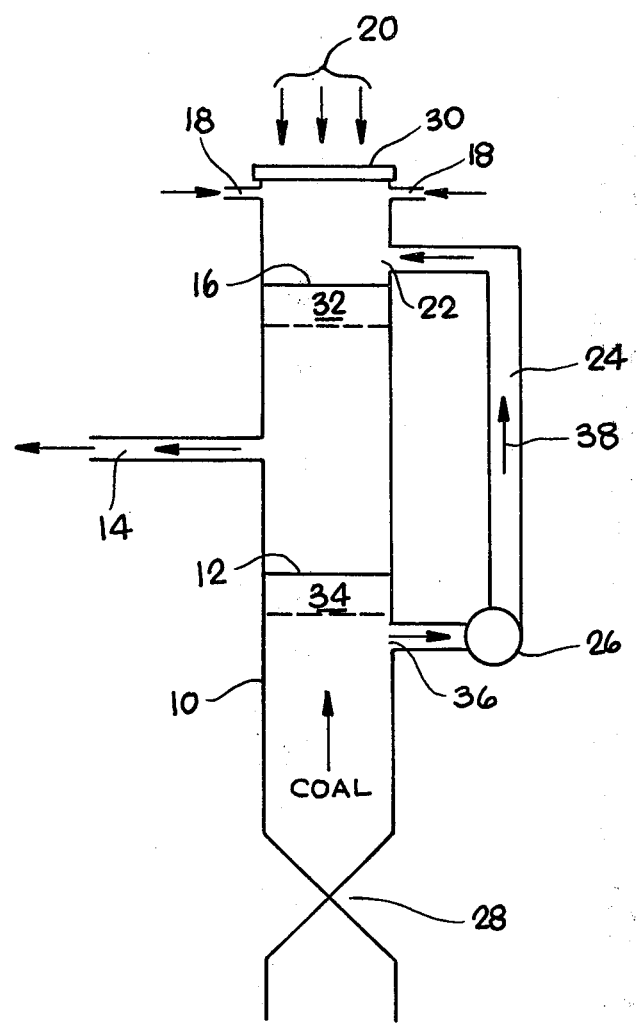
FIG. 2 is a schematic view of a solar reactor constructed in accordance with the present invention.

Referring now to FIG. 2, a schematic view of a solar reactor system for the gasification of coal constructed in accordance with the present invention is illustrated. A solar reactor 10 is positioned to receive concentrated sunlight 20 through a window 30. Technology is currently available for building large solar-energy plants in which sunlight is focussed (e.g., onto a tower) from a large field of mirrors called heliostats. The coal is introduced into the reactor 10 by a coal feed device 28. The solar energy dries and pyrolyzes the coal. This produces carbon dioxide gas, carbon monoxide gas, hydrogen gas, methane gas, higher hydrocarbons including tar, steam, ammonia gas, hydrogen sulfide gas, char and ash. The products are all gases except for the char and ash.

A gasification front 16 is established well above the unreacted feed within the reactor. The hot gases from the gasification zone 32 adjacent gasification front 16 are swept downward, and produce a pyrolysis front 12 nearer the feed. At the same time the hot gases are swept downward, the char is pushed upward into the gasification zone. The char in turn is gasified endothermically by reaction with steam introduced through inlet ports 18. The gases leaving the gasification zone contain considerably more sensible heat than is required to heat the incoming coal to dry and pyrolyze it. Thus part of these gases can be diverted into the product stream. The remaining gases flow downward to contact the fresh coal, heat it, dry it, and generate pyrolysis gases in a pyrolysis zone 34 immediately adjacent the pyrolysis front 12. The pyrolysis gases, along with the remaining gasification gases, combine to form a recycle stream. Blower 26 withdraws these gases 38 through exit port 36 and transmits them upward in pyrolysis gas recycle line 24. The pyrolysis gas recycle stream 38 is injected through injection port 22 into a region of the reactor immediately above the gasification front 16. Steam is injected into the region of the reactor above the gasification front 16 through steam inlet ports 18. The hydrocarbon species from the recycle stream are heated in the gasification zone in contact with the steam and char surface. These hydrocarbons are decomposed by reaction with the steam forming carbon moxide gas, carbon dioxide gas, and hydrogen gas. The concentrated sunlight supplies the heat for these endothermic reactions.

Steam and other species from the recycle stream entering through injection port 22 and from the separately injected steam entering through steam inlet ports 18 are heated in the gasification zone, and react with the char to gasify it. The concentrated sunlight supplies the heat for this endothermic reaction. The ash residue generated by gasification of the coal can be removed as previously explained.

Product gases are removed from the reactor 10 through the product gas withdrawal line 14. These product gases are removed from a region of the reactor located between the gasification front 16 and the pyrolysis front 12. As will be appreciated from the previous explanation, the pyrolysis gas recycle system insures that tars and other hydrocarbons will be steam reformed on the hot char-ash surfaces. In addition, the fixed water content of the coal, which can be as high as about 40 weight %, is vaporized by the process and is used to supply part of the steam for the char-steam reaction. The foregoing provides an improved product gas, with low hydrocarbon content. This product gas would be very suitable for many purposes, including conversion to methanol, according to the equation:

$$CO + 2H_2 \rightarrow CH_3OH$$

The foregoing system for producing a substantially hydrocarbon-free product gas will be more fully appreciated by considering the solar coal gasification of a specific type of coal. Roland Seam (WYODAK) coal can be gasified as follows:

1. The coal is dried and pyrolyzed as it is heated.

$$CH_{0.95}O_{0.19}N_{0.014}S_{0.004}\ 0.489H_2O(coal) \xrightarrow{100\ C} $$

dry coal + 0.498 $H_2$ $$CH_{0.95}O_{0.19}N_{0.014}S_{0.004} \xrightarrow[@\ 3°\ C./min.]{870°\ C.}$$

0.719$CH_{0.14}N_{0.007}S_{0.004}$ +
0.128$CH_{1.40}N_{0.006}S_{0.001}$ (tar) +
0.034$CO_2$ +
0.031$CO$ +
0.091$H_2$ +
0.050$CH_4$ +
0.031$C_3H_7$ (higher hydrocarbon) +
0.098$H_2O$ +
0.008$NH_3$ +
0.001$H_2S$ Pseudomolecules are used to represent the coal, char, tar, and higher hydrocarbon gases. The products are all gases except for the char. The gases are swept downward into the recycle loop, and the char is pushed upward into the gasification zone.

2. Char is gasified endothermically by reaction with $H_2O$:

$$x[0.719CH_{0.14} + 1.438H_2O \rightarrow 0.719CO_2 + 1.488H_2]$$

$$(1-x)[0.719CH_{0.14} + 0.719H_2O \rightarrow 0.179CO + 0.769H_2]$$

The symbol x is a function of reaction temperature. High temperatures give a small x, and thus favor high CO and low $CO_2$ in the product gas.

3. The gases leaving the gasification zone contain considerably more sensible heat than is required to heat the incoming coal, drying and pyrolyzing it. Thus part of these gases can be diverted into the product stream. The remainder flow downward to contact the fresh coal, heat it, and generate the pyrolysis gases.

4. The pyrolysis gases, along with the remainder of the gasification gases, combine to form the recycle stream. This recycle stream is reinjected above the gasification zone. In the gasification zone, all hydrocarbons from the pyrolysis reaction are steam-reformed:

$$y[CH_x + 2H_2O \rightarrow CO_2 + (2 + x/2)H_2]$$

$$(1-y)[CH_x + H_2O \rightarrow CO + (1 + x/2)H_2]$$

High reaction temperatures give a small y, and favor high CO and low $CO_2$ in the product gas.

5. Water from the recycle stream and from the separately injected steam react with the char to gasify it. The concentrated sunlight supplies the heat for this endothermic reaction.

As those skilled in the art know, the temperature sought to be achieved for gasification is at least about 900° K., and typically on the order of about 1100° K. is preferred. The pyrolysis temperature is much lower on the order of several hundred degrees or higher, typically about 600°–800° K. Suitable pressures can vary relatively widely; but, as those skilled in the art know, typically pressures do not exceed about 600 psi ($\approx 40$ atmos.). Pressures of only a few hundred (e.g., 200) or less are generally preferred on balance. These parameters and all the other apparatus and reaction parametes are interdependent, and once one is fixed, the others are restricted, if not fixed. The optimum combination can be readily found by routine experimentation beginning with the coal and the size pieces or particles to be used as feed. The size of the output of the unit is of course very important. It is to be understood that the distance between the pyrolysis zones and the gasification zones can be varied substantially. The important considerations are that they be sufficiently separated to enable a gas product stream to be drawn off which is relatively free of hydrocarbons. That is, the product withdrawal should be far enough toward the pyrolysis zone to provide for essentially complete steam reforming of the hydrocarbons present in the gasification zone, and yet back-stream enough from the pyrolysis zone to be essentially free of hydrocarbons formed in the pyrolysis zone. A generally satisfactory starting point to determine the optimum spacing by routine tests is a ratio of about two (2) to one (1) of separation compared to the reactor diameter. Referring to the drawing, the distance between 22 and 36 is about two times the reactor diameter.

The foregoing description of a preferred embodiment of the invention has been presented for purposes of illustration and description. It is not intended to be exhaustive or to limit the invention to the precise form disclosed, and obviously many modifications and variations are possible in the light of the above teaching. For example, carbon dioxide, hydrogen, or methane gas can be substituted for the steam injected above the gasification zone. In addition, horizontal or inverted operation is entirely feasible. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A method of producing a substantially hydrocarbon-free product gas with a solar reactor from a carbonaceous-material feed, said method comprising the steps of:
   transmitting said feed into said solar reactor;
   directing solar energy into said solar reactor producing a gasification zone spaced from said feed entry by generating hot gases from said feed, said hot gases producing a pyrolysis zone between said gasification zone and said feed entry, with pyrolysis gases and char being produced at said pyrolysis zone;
   withdrawing said pyrolysis gases from said pyrolysis zone;
   inserting said pyrolysis gases between the solar energy reactor entry and said gasification zone, which is spaced from said pyrolysis zone and said feed entry; and
   withdrawing substantially hydrocarbon-free product gas from said reactor between said gasification zone and said pyrolysis zone.

2. The method of producing a substantially hydrocarbon-free product gas with a solar reactor from a said feed of claim 1, wherein reactive gas is inserted with said pyrolysis gases between said solar energy reactor entry and said gasification zone, which is spaced from said pyrolysis zone and said feed entry.

3. The method of producing a substantially hydrocarbon-free producing gas according to claim 1, wherein the feed is coal and includes water, thereby generating steam from said water, withdrawing said steam along with said pyrolysis gases, and inserting said steam with said pyrolysis gases between said solar energy reactor entry and said gasification zone, which is spaced from said pyrolysis zone and said feed entry.

4. The method of producing a substantially hydrocarbon-free product gas according to claim 1, including the steps of:
   injecting at least one reactive gas selected from the group consisting of steam, $CO_2$, $H_2$ and $CH_4$ into said solar reactor between said solar energy reactor entry and said gasification zone, which is spaced from said pyrolysis zone and said feed entry; and
   circulating said reactive gas into said gasification zone to steam reform hydrocarbons in said pyrolysis zone.

5. The method of producing a substantially hydrocarbon-free product gas with a solar reactor from a feed of claim 1, including the steps of:
   injecting steam into said reactor between said solar energy reactor entry and said gasification zone, which is spaced from said pyrolysis zone and said feed entry; and
   circulating said steam into said gasification zone to react with hydrocarbons and eliminate hydrocarbons from said product gas.

6. Method of producing a substantially hydrocarbon-free product gas with a solar reactor from a feed of claim 1, including the steps of:
   injecting carbon dioxide into said reactor between said solar energy reactor entry and said gasification zone, which is spaced from pyrolysis zone and said feed entry; and
   circulating said carbon dioxide into said gasification zone to react with hydrocarbons and eliminate hydrocarbons from said product gas.

7. A solar carbonaceous-material gasification apparatus, comprising:
   a solar energy reactor;
   means for transmitting a feed into said reactor;
   means for directing solar energy into said reactor onto said feed which includes a solar energy reactor entry means, thereby producing a gasification front, by generating gases from said feed, and producing a pyrolysis front;
   means for withdrawing generated gases below said pyrolysis front and injecting said withdrawn gases between said solar energy reactor entry means and said gasification front; and
   means for withdrawing product gases from said reactor.

8. The solar gasification apparatus of claim 6, wherein said means for withdrawing product gas from said reactor withdraws the product gas from between said gasification front and said pyrolysis front.

9. The solar gasification apparatus of claim 8, including means for injecting a reactive gas selected from the group consisting of steam, $CO_2$, $H_2$ and $CH_4$ into said reactor above said gasification front but below said solar energy reactor entry means.

10. The solar gasification apparatus of claim 8, including means for injecting steam into said reactor above said gasification front but below said solar energy reactor entry means.

* * * * *